United States Patent [19]

Baney et al.

[11] 4,298,559

[45] Nov. 3, 1981

[54] HIGH YIELD SILICON CARBIDE FROM ALKYLATED OR ARYLATED PRE-CERAMIC POLYMERS

[75] Inventors: Ronald H. Baney; John H. Gaul, Jr., both of Midland, Mich.

[73] Assignee: Dow Corning Corporation, Midland, Mich.

[21] Appl. No.: 171,557

[22] Filed: Jul. 23, 1980

[51] Int. Cl.$^3$ .............................................. F27B 9/04
[52] U.S. Cl. ....................................... 264/65; 501/88; 260/37 SB; 423/344; 423/345; 427/387; 427/350; 428/446; 428/467; 428/429; 528/12; 528/18; 528/13; 528/29; 556/430; 556/431; 556/480

[58] Field of Search ...................... 556/480, 430, 431; 264/65; 106/44; 423/344, 345; 528/29, 25, 12, 18, 13; 427/350, 387; 428/446, 467, 429; 260/37 SB

[56] References Cited

U.S. PATENT DOCUMENTS

| | | | |
|---|---|---|---|
| 3,853,567 | 12/1974 | Verbeek | 106/44 |
| 4,052,430 | 10/1977 | Yajima et al. | 556/431 |
| 4,105,455 | 8/1978 | Koga et al. | 106/44 |

*Primary Examiner*—Melvyn I. Marquis
*Attorney, Agent, or Firm*—Robert L. McKellar

[57] ABSTRACT

Pre-polymers which are alkylated or arylated methylpolysilanes are useful for the preparation of silicon carbide ceramic materials. The pre-polymers exhibit ease of handling and their use to obtain silicon carbide ceramic materials results in high yields.

11 Claims, No Drawings

HIGH YIELD SILICON CARBIDE FROM ALKYLATED OR ARYLATED PRE-CERAMIC POLYMERS

BACKGROUND OF THE INVENTION

The concept of preparing silicon carbide ceramic materials or silicon carbide-containing ceramics from silicon carbide ceramic materials is not new. As applied to the preparation of silicon carbide-containing ceramics from the degradation of polymers, any number of published articles or issued patents have appeared.

Yajima in U.S. Pat. No. 4,052,430, issued Oct. 4, 1977, has described the preparation of polycarbosilanes prepared by pyrolyzing the polysilanes generated by the reaction of sodium or lithium metal with dimethyldichlorosilane. These polycarbosilanes can be heated to yield beta-silicon carbide.

West and Maszdiazni reported in the 22nd AFOSR Chemistry Program Review FY77, R. W. Heffner ed. March (1978), that a polymer, made by reacting dimethyldichlorosilane with methylphenyldichlorosilane and an alkali metal, could be fired at high temperatures to yield whiskers of beta-silicon carbide.

Verbeek has shown in U.S. Pat. No. 3,853,567, the preparation of a mixed ceramic of silicon carbide and silicon nitride by pyrolyzing a polysilazane. In addition, Verbeek has prepared a polycarbosilane suitable for molding by heating organosilicon polymers optionally mixed with silicon dioxide or organic polymers at a temperature between 400° and 1200° C.

Rice et al., in U.S. Pat. No. 4,097,794 issued June 27, 1978, have suggested that almost anything containing silicon can be pyrolyzed to give a ceramic material.

Baney, in U.S. patent application Ser. No. 910,247, filed May 30, 1978, now abandoned, and continued as a continuation-in-part, Ser. No. 024,137, filed Mar. 26, 1979, now abandoned and continued as a continuation-in-part of Ser. No. 135,567, filed Mar. 31, 1980 discloses methylhalopolysilanes which can be fired at 1200° C. or higher to yield fine grain beta-silicon carbide.

Mention should be made of recent Japanese patent publications Nos. 80500/78 and 101099/78 in the name of Takamizawa et al. These publications deal with polymers made from methylchlorodisilanes but no mention is made of the yields of ceramic material generated by the decomposition of the polysilanes. Recent publications by Nakamura (Japanese Kokai Nos. 79/114600 and 79/83098) suggest that the preparation of silicon carbide precursor polymers having a silicon-carbon (Si—C—Si—) backbone are prepared by heating organosilicon compounds (including $(CH_3)_3SiSi(CH_3)_2Cl$) in the presence of B, Al, Si, Ge, Sn and Pb compounds or HI and its salts, at high temperatures.

It has now been determined that high yields of silicon carbide ceramic materials and silicon carbide-containing ceramics can be obtained from the methods and the new materials of the instant invention.

THE INVENTION

This invention deals with a process for obtaining new and novel polysilanes which process consists of a method of preparing a polysilane which is a solid at 25° C. having the average formula $$\{(CH_3)_2Si\}\{CH_3Si\} \qquad (I)$$

in which polysilane there is from 0 to 60 mole percent $(CH_3)_2Si=$units and 40 to 100 mole percent $CH_3Si\equiv$units, wherein there is also bonded to the silicon atoms other silicon atoms and additional alkyl radicals of 1 to 4 carbon atoms or phenyl which method consists of (A) reacting a polysilane which is a solid at 25° C. having the average unit formula $$\{(CH_3)_2Si\}\{CH_3Si\} \qquad (II)$$

in which there is from 0 to 60 mole percent $(CH_3)_2Si=$units and 40 to 100 mole percent $CH_3Si\equiv$units, wherein the remaining bonds on the silicon atoms are attached to either another silicon atom, a chlorine atom or a bromine atom such that the polysilane contains from 10-38 weight percent, based on the weight of the polysilane, of hydrolyzable chlorine or 21-58 weight percent based on the weight of the polysilane of hydrolyzable bromine, with an alkyl or aryl Grignard reagent having the general formula RMgX where X is a halogen and R is an alkyl group of 1-4 carbon atoms or phenyl at a temperature of from 0° to 120° C. for a period of from 1 to 48 hours, in a suitable solvent, and (B) thereafter recovering the polysilane (I).

This invention also deals with a composition of matter which is a polysilane which is a solid at 25° C. having the average formula $$\{(CH_3)_2Si\}\{CH_3Si\} \qquad (I)$$

in which polysilane there is from 0 to 60 mole percent $(CH_3)_2Si=$units and 40 to 100 mole percent $CH_3Si\equiv$units, wherein there is also bonded to the silicon atoms other silicon atoms and additional alkyl radicals of 1 to 4 carbon atoms or phenyl. Further, this invention deals with shaped articles made from the polysilanes, with, or without fillers, and a method by which the shaped articles are obtained.

The inventions described herein represent an improvement over the art, in that, higher yields of silicon carbide ceramic materials are obtained upon pyrolysis of the polysilanes and the polysilanes herein are much easier and safer to handle because the replacement of halide substituents with alkyl or aryl radicals limits hydrolysis to a certain extent and thus reduces the quantity of corrosive HCl or HBr gas liberated.

For example, the Yajima technology referred to above generally allows one to obtain about a 60% yield of the polycarbosilane described by Yajima but only about 24% of silicon carbide is obtained compared to the 20 to 75% yields of silicon carbide ceramic materials that are obtained by this invention.

This invention results from replacing halogen atoms on the above described polyhalosilanes with alkyl groups of 1-4 carbon atoms or phenyl groups, which upon pyrolysis give silicon carbide ceramic materials.

The polyhalosilane starting materials are those set forth and described in the Baney patent application Ser. No. 910,247, filed May 30, 1978, now abandoned, and continued as a continuation-in-part, Ser. No. 024,137, filed Mar. 26, 1979 now abandoned and continued as a continuation-in-part as Ser. No. 135,567, filed Mar. 31, 1980, which are hereby incorporated by reference.

The starting materials are those described in the Baney application which consist of 10-38 weight percent, based on the weight of the polysilane, of hydrolyzable chlorine or 21–58 weight percent, based on the weight of the polysilane, of hydrolyzable bromine.

These polyhalosilane starting materials can be prepared by treating methylhalodisilanes with catalysts such as $(C_4H_9)_4P^+Cl^-$ or, they can be prepared by treating halosilane residue which is derived from the Direct Synthesis of halosilanes. The aforementioned disilane is found in large quantities in the residue (See Eaborn, "Organosilicon Compounds", Butterworths Scientific Publications, 1960, page 1).

The polychlorosilane starting materials are then subjected to a treatment with an aryl or alkyl Grignard reagent to obtain the inventive polysilane.

Generally, the process consists of placing an ether or tetrahydrofuran solution of the Grignard reagent in a suitably equipped reaction vessel and thereafter adding the starting polyhalosilane directly into the reaction vessel as a solvent solution. After the initial reaction and exotherm has taken place, the reaction mass is stirred and sometimes heated to ensure complete reaction. It is then cooled and filtered. It is generally necessary to cool the reaction mass during the initial reaction stages. The resulting products are solids.

These materials then are shaped (if desired), filled with ceramic type fillers (if desired) and fired to temperatures of 1200° C. or higher in vacuo or in an inert atmosphere to obtain silicon carbide ceramic materials or silicon carbide-containing ceramic articles.

Thus, this invention contemplates the preparation of a filled ceramic article prepared from the silicon carbide ceramic materials of this invention. The method consists of (A) mixing a polysilane with at least one conventional ceramic filler which polysilane has the average formula

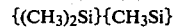

in which polysilane there is from 0 to 60 mole percent $(CH_3)_2Si=$ units and 40 to 100 mole percent $CH_3Si\equiv$ units, wherein there is also bonded to the silicon atoms other silicon atoms and additional alkyl radicals of 1 to 4 carbon atoms or phenyl; (B) forming an article of the desired shape from the mixture of polysilane and fillers and, (C) heating the article formed in (B) in an inert atmosphere or in a vacuum to an elevated temperature in the range of 1200° C. to 1600° C. until the polysilane is converted to a silicon carbide-containing ceramic.

It is also contemplated within the scope of this invention to prepare articles which are coated with the silicon carbide ceramic materials of this invention which are then pyrolyzed to give articles coated with silicon carbide-containing ceramics. Thus, the method of preparing such an article coated with ceramic consists of (A) mixing a polysilane with at least one conventional ceramic filler which polysilane has the average unit formula

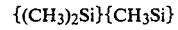

in which polysilane there is from 0 to 60 mole percent $(CH_3)_2Si=$ units and 40 to 100 mole percent $CH_3Si\equiv$ units, wherein there is also bonded to the silicon atoms other silicon atoms and additional alkyl radicals of 1 to 4 carbon atoms or phenyl; (B) coating a substrate with the mixture of polysilane and fillers and, (C) heating the coated substrate in an inert atmosphere or in a vacuum to an elevated temperature in the range of 1200° C. to 1600° C. until the coating is converted to a silicon carbide ceramic material whereby a silicon carbide-containing ceramic coated article is obtained.

As indicated above, the hydrolyzable chlorine content of the starting polychlorosilane is 10–38 weight percent, based on the weight of the polysilane while the hydrolyzable bromine content of the polysilane is 21–58 weight percent based on the weight of the polysilane.

The Grignard reagents useful herein are those reagents commonly known in the art for Grignard type reactions. Such materials are, for example, alkyl magnesium halides and aryl magnesium halides. For purposes of this invention, it is preferred to use Grignard reagents having the general formula RMgX wherein R is an alkyl radical of 1–4 carbon atoms or phenyl and X is either chlorine or bromine. Most preferred Grignard reagents are $CH_3MgCl$ and phenyl $MgCl$. Typical Grignard reaction solvents can be used herein. Preferred are alkylethers and tetrahydrofuran. Most preferred are the alkyl ethers, specifically, diethylether.

It is contemplated with the scope of this invention to use a combination of reagents so as to vary the carbon content as desired.

For best results, dry reaction conditions should be observed.

Solvents for the starting polyhalosilanes can be any organic solvent in which the material is soluble and which does not react with the material except in the desired manner. Examples of useful solvents include toluene, xylene, benzene, tetrahydrofuran and ethers. Specifically, toluene is preferred.

Generally it has been found preferable to add the polyhalosilane to an excess of Grignard reagent, both in a solvent solution. This addition and reaction is carried out while the materials are stirred or otherwise agitated.

The reaction is carried out in a dry inert atmosphere such as in the presence of nitrogen or argon gas to prevent the introduction of water into the reaction vessel.

The reaction can be run at temperatures of 0° to 120° C. but preferably the reaction is run at room temperature or slightly below room temperature to prevent or decrease undesirable side reactions. After the addition of the reagent is complete, the reaction mixture is stirred for a time, with or without heating, to ensure the completion of the reaction. Excess Grignard reagent is then destroyed using water, HCl or an alcohol.

The reaction mixture is cooled to room temperature and then filtered by conventional means and the solvents and other volatile materials are then removed by stripping under vacuum with the addition of heat. The resulting polysilanes are solids.

The resulting materials are then formed into shapes, such as by melt spinning, and fired at elevated temperatures to yield silicon carbide-containing shaped articles.

Filled silicon carbide ceramic materials can be made by adding fillers and adjuvants to the polysilane before firing.

For example, fine silicon carbide grains can be used as fillers in the polysilanes of this invention and when the mixture is fired, high strength silicon carbide-containing ceramics result.

Fillers and adjuvants can be milled on 3 roll mills by simply mixing the polysilanes of this invention with the fillers and making several passes on the mill. The mixture is then shaped to the desired form and then fired to prepare the silicon carbide-containing ceramic.

Usually, the materials of this invention, whether filled or unfilled, are heated to 1200° C. and above to ceramify them. Generally, 1600° C. is usually the hottest temperature required to convert the polysilanes to silicon carbide. Thus, heating the polysilanes from 1200° C. to 1600° C. will suffice to give optimum physical properties in the final ceramic product.

The following examples are for purposes of illustration only and are not intended to limit the scope of this invention.

Titration of chloride ion in these examples was made in a solution of toluene and isopropanol (essentially non-aqueous) using a 0.1% solution of tetrabromophenophthalein ethyl ester in methanol/toluene solvent. Titration was carried out using a 0.5 N KOH in ethanol.

EXAMPLE 1

A methylchloropolysilane was prepared by placing 750 grams of distilled direct process residue (from the Direct Synthesis of organochlorosilanes by passing the vapor of an organic chloride over heated silicon and a catalyst) in a 1 liter, 3-necked, round bottomed glass flask and adding thereto 4.5 grams of tetrabutylphosphonium chloride. This mixture was heated to 275° C. while removing low molecular weight silanes by distillation. It was held at 275° C. for 1 hour. The reaction was carried out using a blanket of argon gas in the flask. This material when titrated contained about 13 weight percent hydrolyzable chlorine.

Fifty-five grams of this material was dissolved in 100 ml. of tetrahydrofuran solvent. This solution was placed in a 125 ml addition funnel by filtering through glass wool. One hundred ten ml of 2.0 molar tetrahydrofuran solution of $CH_3MgCl$ was syringed into a dried 500 ml, 3-necked, round bottomed flask equipped with a water-cooled condenser, stirrer and the addition funnel. This flask was then flushed with argon and the reaction was maintained under an argon blanket. The reaction vessel was cooled with an ice and water bath. The methylchloropolysilane was added dropwise over a 30 minute period to the $CH_3MgCl$. After the addition, the ice bath was removed and the reaction mixture allowed to rise to room temperature. Heat was then applied to the red-brown reaction mixture. As the temperature neared reflux, the solution gradually thickened until the mixture solidified. Cooling was begun with vigorous stirring. The mass broke up and heat was again applied and the reaction mixture re-liquified. Refluxing was continued for 18 hours. Enough 0.1 normal HCl was then added to destroy any excess Grignard reagent. The slurry was stirred 1 hour and then gravity filtered to give a pale yellow solution. The precipitate was washed with ether and added to the filtrate. This solution was evaporated by using vacuum and mild heating to give a white solid. It was then resolubilized in ether and filtered and dried. It was dissolved in warm toluene and filtered and dried under vacuum to give an off-white solid. The 'H—NMR spectrum showed an area of intense absorption in the methyl region. Infra red studies showed two different Si—$CH_3$ types. Gel permeation chromatography showed $M_n$ of 543; $M_w$ of 856 bimodal peak.

EXAMPLE 2

A methylchloropolysilane was prepared in a similar manner as in Example 1. 783 grams of distilled direct process residue was used with 8.0 grams of tetrabutylphosphonium chloride catalyst. The final temperature was 250° C. for a time of about 30 minutes. This material was titrated and contained 15.3 weight percent hydrolyzable chlorine. This material was dissolved in about 200 mls of dry toluene.

About 600 mls of 1.0 molar $CH_3MgCl$ in tetrahydrofuran was placed in a 2 liter, 3-necked, round bottomed glass flask under an argon blanket. The methylchloropolysilane was added thereto in a dropwise fashion with stirring while the reaction mixture was cooled with an ice bath. This was done over a thirty minute period. The reaction mass was warmed to room temperature (4 hours) and then brought to reflux, by means of heat, for 1½ hours. It was then cooled to room temperature and 50 mls of water was cautiously added to destroy any excess Grignard reagent. It was filtered, dried using $MgSO_4$ and evaporated to dryness to yield a white solid. A sample was titrated to 0.32 weight percent chlorine. Ebulliometry showed $M_n$ of 1221 g/mole. Gel permeation chromatography showed $M_n$ of 1020 and $M_w$ of 4730.

EXAMPLE 3

A methylchloropolysilane was prepared in a manner similar to Example 1 using 622.5 grams of distilled direct process residue and 6.23 grams of tetrabutylphosphonium chloride catalyst. Under an argon blanket, the material was heated to 200° C. and held for 1 hour. It was then cooled and allowed to stand overnight. One hundred eighty four grams of dry toluene was added to make a solution. This solution was titrated and found to contain 5.3 weight percent chlorine.

Two hundred eighty eight and six tenths grams of the above polysilane solution was added under argon to 178 mls of 2.8 molar $CH_3MgCl$ in tetrahydrofuran. The reaction mixture warmed during the addition. It was stirred for 18 hours then 150 grams of water was added over 30 minutes. The reaction mixture was filtered and dried with $MgSO_4$. It was filtered again and dried under vacuum to yield a creamy colored solid. A sample of the creamy colored solid material was titrated for hydrolyzable chlorine and found to contain 0.27 weight percent chlorine. Ebulliometry gave an $M_n$ of 1014. Gel permeation chromatography gave $M_n$ of 647 and $M_w$ of 1210.

EXAMPLE 4

A methylchloropolysilane was prepared as in Example 1 above. Five hundred ninety eight and two tenths grams of distilled direct process residue was used with 6.0 grams of tetrabutylphosphonium chloride catalyst at 250° C. final temperature for 1 hour. This material was titrated to give about 11% hydrolyzable chlorine.

Two hundred fifty nine and one tenth grams of the above polymer dissolved in toluene was added under argon to 100 mls of 3.2 molar phenyl MgBr in diethyl ether and diluted with 175 mls of diethyl ether. The mixture, after addition, was refluxed for 6 hours and then allowed to stand overnight (18 hours). Two hundred fifty grams of water was added over 1 hour to destroy any excess Grignard reagent. The reaction mixture was then filtered, dried using $MgSO_4$, refiltered and evaporated to dryness under vacuum to yield a pale yellow solid. Ebulliometry yielded an $M_n$ of 1267 g/mole. % Cl by titration was 0.8. Infrared showed the presence of Si 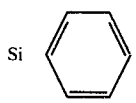

and Si—CH₃. Gel permeation chromatography showed $M_n$ of 516 and $M_w$ of 1110.

EXAMPLE 5

A methylchloropolysilane was prepared essentially the same as in Example 1 except that 354.5 grams of direct process residue was used with 3.6 grams of catalyst at a temperature of about 175° C. for 2 hours. A sample of this material was titrated and found to contain 25.7% hydrolyzable chlorine.

Two hundred fifty ml. of 3.2 Molar phenyl-MgBr in diethyl ether was syringed into a 1000 ml., 3-necked, round bottomed flask and the system was flushed with argon. Under the argon purge, the methylchloropolysilane dissolved in toluene was added dropwise to the Grignard reagent with cooling for ½ hour and with rapid stirring. The solution turned olive green in color. After the addition, the reaction mixture was brought to room temperature. The solution was slowly heated to reflux and allowed to reflux for about 16 hours. It was then cooled to room temperature. Twenty-five mls of 0.1 normal HCl was added slowly to the reaction mixture to destroy any excess Grignard reagent. The ether solution was filtered. Fifty mls of 0.1 N HCl was added to the ether solution and some white precipitate formed. The yellow ether solution was decanted and was dried using Na₂SO₄. It was then filtered and evaporated to dryness under vacuum. The resulting dry material was re-treated with hexane, ether and MgSO₄ and again filtered and dried to a solid. A sample of the dry solid was found to contain about 3.8 weight percent hydrolyzable chlorine by titration. Infrared studies showed the presence of Si 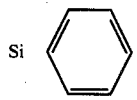

and Si—CH₃. ¹H—NMR showed

SiCH₃/Si 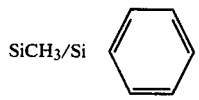

to be 3.45:1. Ebulliometry showed 873 grams/mole.

EXAMPLE 6

Thermogravimetric analysis were run on the examples listed below to determine if silicon carbide ceramic materials could be prepared from the new polymers and also to determine the yield of silicon carbide ceramic materials from these new polymers.

| Example # | 850° C./% yield | 1555° C./% yield |
|---|---|---|
| 2 | 51.9 | 47.7 |
| 3 | 67.5 | 62.5 |
| 5 |  | 32.6 |

EXAMPLE 7

Programmed thermogravimetric analysis was performed on several of the new polymers with the following results:

| Example # | 1200° C./% yield | 1600° C./% yield | 2000° C./% yield |
|---|---|---|---|
| 2 | 58.7 | 52.0 | 47.8 |
| 4 | 74.7 | 74.0 | 71.3 |
| 5 | 37.2 | 30.1 | 29.5 |

Materials were fired in a series 1000A water cooled graphite heated model 1000.3060-FP-12 Astro Industries furnace under an argon atmosphere and at heating rates of 300°/hr to 300° C., 200° C./hr to 500° C., 100° C./hr to 700° C., and then 300°/hr to 1000° C. and finally as rapidly as possible to 2000° C. (usually 8 hours or more).

That which is claimed is:

1. A method of preparing a polysilane having the average formula $$\{(CH_3)_2Si\}\{CH_3Si\} \quad (I)$$

in which polysilane there is from 0 to 60 mole percent $(CH_3)_2Si=$units and 40 to 100 mole percent $CH_3Si\equiv$units, wherein there is also bonded to the silicon atoms other silicon atoms and additional alkyl radicals of 1 to 4 carbon atoms or phenyl, which method consists of (A) reacting under anhydrous conditions, a polysilane which is a solid at 25° C. having the average unit formula $$\{(CH_3)_2Si\}\{CH_3Si\} \quad (II)$$

in which there is from 0 to 60 mole percent $(CH_3)_2Si=$units and 40 to 100 mole percent $CH_3Si=$units, wherein the remaining bonds on the silicon atoms are attached to either another silicon atom, a chlorine atom or a bromine atom such that the polysilane contains from 10–38 weight percent, based on the weight of the polysilane, of hydrolyzable chlorine of 21–58 weight percent based on the weight of the polysilane of hydrolyzable bromine, with an alkyl or aryl Grignard reagent having the general formula RMgX where X is a halogen and R is an alkyl group of 1 to 4 carbon atoms or phenyl at a temperature of from 0° to 120° C. for a period of from 1 to 48 hours, in a suitable solvent, and (B) thereafter recovering the polysilane (I).

2. A method as claimed in claim 1 wherein there is present at least a stoichiometric quantity of Grignard reagent present based on the amount of halogen present in the polysilane (II).

3. A composition of matter consisting essentially of a polysilane which is a solid at room temperature having the average unit formula $$\{(CH_3)_2Si\}\{CH_3Si\}$$

in which polysilane there is from 0 to 60 mole percent $(CH_3)_2Si=$units and 40 to 100 mole percent $CH_3Si\equiv$units, wherein there is also bonded to the silicon atoms other silicon atoms and additional alkyl radicals of 1 to 4 carbon atoms or phenyl.

4. A method of preparing silicon carbide ceramic material which consists of heating to at least 1200° C. a polysilane having the average unit formula {(CH₃)₂Si}{CH₃Si} in which polysilane there is from 0 to 60 mole percent (CH₃)₂Si≡units and 40 to 100 mole percent CH₃Si≡units wherein there is also bonded to the silicon atoms other silicon atoms and additional alkyl radicals of 1 to 4 carbon atoms or phenyl.

5. Silicon carbide ceramic materials prepared by the method as claimed in claim 4.

6. A method of preparing a silicon carbide-containing ceramic article which consists of
   (A) forming an article of the desired shape from a polysilane having the average formula {(CH₃)₂Si}{CH₃Si} in which polysilane there is from 0 to 60 mole percent (CH₃)₂Si≡units and 40 to 100 mole percent CH₃Si≡units, wherein there is also bonded to the silicon atoms other silicon atoms and additional alkyl radicals of 1 to 4 carbon atoms or phenyl; and
   (B) heating the article formed in (A) in an inert atmosphere or in a vacuum to an elevated temperature in the range of 1200° C. to 1600° C. until the polysilane is converted to silicon carbide-containing ceramic.

7. The article prepared by the method of claim 6.

8. A method of preparing a filled ceramic article which consists of
   (A) mixing a polysilane with at least one conventional ceramic filler which polysilane has the average formula {(CH₃)₂Si}{CH₃Si} in which polysilane there is from 0 to 60 mole percent (CH₃)₂Si≡units and 40 to 100 mole percent CH₃Si≡units, wherein there is also bonded to the silicon atoms other silicon atoms and additional alkyl radicals of 1 to 4 carbon atoms or phenyl;
   (B) forming an article of the desired shape from the mixture of polysilane and fillers and,
   (C) heating the article formed in (B) in an inert atmosphere or in a vacuum to an elevated temperature in the range of 1200° C. to 1600° C. until the polysilane is converted to a silicon carbide-containing ceramic.

9. An article prepared by the method of claim 8.

10. A method of preparing an article coated with ceramic which consists of
    (A) mixing a polysilane with at least one conventional ceramic filler which polysilane has the average unit formula {(CH₃)₂Si}{CH₃Si} in which polysilane there is from 0 to 60 mole percent (CH₃)₂Si≡units and 40 to 100 mole percent CH₃Si≡units, wherein there is also bonded to the silicon atoms other silicon atoms and additional alkyl radicals of 1 to 4 carbon atoms or phenyl;
    (B) coating a substrate with the mixture of polysilane and fillers and,
    (C) heating the coated substrate in an inert atmosphere or in a vacuum to an elevated temperature in the range of 1200° C. to 1600° C. until the coating is converted to a silicon carbide ceramic material whereby a silicon carbide-containing ceramic coated article is obtained.

11. An article prepared by the method of claim 10.

* * * * *